(12) United States Patent
Turek et al.

(10) Patent No.: US 10,427,545 B2
(45) Date of Patent: Oct. 1, 2019

(54) ELECTRIC VEHICLE SUPPLY EQUIPMENT (EVSE) FAULT INDICATOR SYSTEMS

(71) Applicant: FORD GLOBAL TECHNOLOGIES, LLC, Dearborn, MI (US)

(72) Inventors: Joseph Matthew Turek, Canton, MI (US); Sriram Jala, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/873,942

(22) Filed: Jan. 18, 2018

(65) Prior Publication Data

US 2019/0217714 A1 Jul. 18, 2019

(51) Int. Cl.
*B60L 53/16* (2019.01)
*B60L 3/00* (2019.01)

(52) U.S. Cl.
CPC ............... *B60L 53/16* (2019.02); *B60L 3/00* (2013.01); *B60L 2230/10* (2013.01)

(58) Field of Classification Search
CPC ..... B60L 11/1818; B60L 3/00; B60L 2230/10
USPC ............................................. 340/657
See application file for complete search history.

(56) References Cited

U.S. PATENT DOCUMENTS

| | | | |
|---|---|---|---|
| 8,568,155 B2 * | 10/2013 | Sebald | B60L 11/1818 439/304 |
| 8,633,678 B2 | 1/2014 | Yegin et al. | |
| 9,121,073 B2 | 9/2015 | Miller et al. | |
| 2011/0172839 A1 * | 7/2011 | Brown | B60L 3/0069 700/292 |
| 2012/0091824 A1 * | 4/2012 | Campolo | B60L 11/1818 307/135 |
| 2012/0206100 A1 * | 8/2012 | Brown | B60L 3/0069 320/109 |
| 2014/0015482 A1 * | 1/2014 | Nitzberg | B60L 11/1816 320/109 |
| 2016/0068073 A1 * | 3/2016 | Taylor | B60L 11/1818 320/109 |
| 2016/0121736 A1 | 5/2016 | Jefferies et al. | |
| 2016/0144728 A1 * | 5/2016 | Harper | B60L 11/1803 320/109 |
| 2016/0229305 A1 * | 8/2016 | Shumaker | G06F 21/34 |
| 2016/0327615 A1 * | 11/2016 | Wallace | B60L 11/1809 |
| 2018/0001776 A1 * | 1/2018 | Kim | G06Q 50/06 |
| 2018/0065495 A1 * | 3/2018 | Masuda | B60L 11/1818 |

* cited by examiner

*Primary Examiner* — Santiago Garcia
(74) *Attorney, Agent, or Firm* — Carlson, Gaskey & Olds

(57) ABSTRACT

An electric vehicle supply equipment (EVSE) assembly includes a control box including a first fault indicator light assembly, a coupler including a second fault indicator light assembly, and a plug including a third fault indicator light assembly. The fault indicator light assemblies can be illuminated to indicate charging faults.

18 Claims, 4 Drawing Sheets

ELECTRIC VEHICLE SUPPLY EQUIPMENT (EVSE) FAULT INDICATOR SYSTEMS

TECHNICAL FIELD

This disclosure relates generally to charging systems for electrified vehicles. More particularly, this disclosure details fault indicator systems for identifying the source of charging faults on electric vehicle supply equipment (EVSE) assemblies.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A charging system connects an electrified vehicle to an external power source, such as a wall outlet or a charging station, for charging the energy storage devices of the electrified vehicle battery pack. Some charging systems include electric vehicle supply equipment (EVSE) assemblies that receive electric power from a utility grid or other external power source and transfer the power to the vehicle through a coupler that plugs into a vehicle inlet assembly.

Customers can experience various charging system faults when charging their vehicle. Currently, when the EVSE assembly indicates a fault, it is interpreted by the customer/technician as an EVSE fault even though it is a grid or vehicle issue. An improved EVSE fault indicator system is therefore desirable within this field of technology.

SUMMARY

An electric vehicle supply equipment (EVSE) assembly according to an exemplary aspect of the present disclosure includes, among other things, a control box including a first fault indicator light assembly, a coupler including a second fault indicator light assembly, and a plug including a third fault indicator light assembly.

In a further non-limiting embodiment of the foregoing assembly, a first wire extends between the coupler and the control box, and a second wire extends between the plug and the control box.

In a further non-limiting embodiment of either of the foregoing assemblies, the third fault indicator light assembly is disposed on the second wire at a location near the plug.

In a further non-limiting embodiment of any of the foregoing assemblies, the first fault indicator light assembly is at least partially embedded or molded within an upper surface of a housing of the control box.

In a further non-limiting embodiment of any of the foregoing assemblies, the first fault indicator light assembly is disposed about an entirety of an outer perimeter of the upper surface.

In a further non-limiting embodiment of any of the foregoing assemblies, the second fault indicator light assembly is at least partially embedded or molded within an upper surface of a housing of the coupler.

In a further non-limiting embodiment of any of the foregoing assemblies, the second fault indicator light assembly is located on a handle portion of the coupler.

In a further non-limiting embodiment of any of the foregoing assemblies, the third fault indicator light assembly is at least partially embedded or molded into a plug head of the plug.

In a further non-limiting embodiment of any of the foregoing assemblies, the third fault indicator light assembly is at least partially embedded or molded into a plug shield of the plug.

In a further non-limiting embodiment of any of the foregoing assemblies, the third fault indicator light assembly is a ring that extends around a peripheral surface of a plug head or a plug shield of the plug.

In a further non-limiting embodiment of any of the foregoing assemblies, each of the first, second, and third fault indicator light assemblies includes an insert, a light source, and a printed circuit board (PCB).

In a further non-limiting embodiment of any of the foregoing assemblies, a control module is configured to command illumination of the first fault indicator light assembly if a source of a charging fault is any component of the EVSE assembly.

In a further non-limiting embodiment of any of the foregoing assemblies, a control module is configured to command illumination of the second fault indicator light assembly if a source of a charging fault is on-board an electrified vehicle.

In a further non-limiting embodiment of any of the foregoing assemblies, a control module is configured to command illumination of the third fault indicator light assembly if a source of a charging fault is an external power source.

A method according to another exemplary aspect of the present disclosure includes, among other things, illuminating a first fault indicator light assembly on a first component of an electric vehicle supply equipment (EVSE) assembly in response to a first charging fault and illuminating a second fault indicator light assembly on a second component of the EVSE assembly in response to a second charging fault.

In a further non-limiting embodiment of the foregoing method, the first component is a control box of the EVSE assembly and the second component is a coupler of the EVSE assembly.

In a further non-limiting embodiment of either of the foregoing methods, the method includes illuminating a third fault indicator light assembly on a third component of the EVSE assembly in response to a third charging fault.

In a further non-limiting embodiment of any of the foregoing methods, the first component is a control box of the EVSE assembly, the second component is a coupler of the EVSE assembly, and the third component is a plug of the EVSE assembly.

In a further non-limiting embodiment of any of the foregoing methods, illuminating the first fault indicator light assembly includes turning a light source of the first fault indicator light assembly ON, and illuminating the second fault indicator light assembly includes turning a light source of the second fault indicator light assembly ON.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes portable electric vehicle supply equipment (EVSE) assemblies for electrified vehicles. An exemplary EVSE assembly includes a control box including a first fault indicator light assembly, a coupler including a second fault indicator light assembly, and a plug including a third fault indicator light assembly. One of the first, second, and third fault indicator light assemblies is automatically illuminated in response to detecting a charging fault, thereby identifying a source of the charging fault. These and other features are described in greater detail in the following paragraphs of this detailed description.

Figure 1:
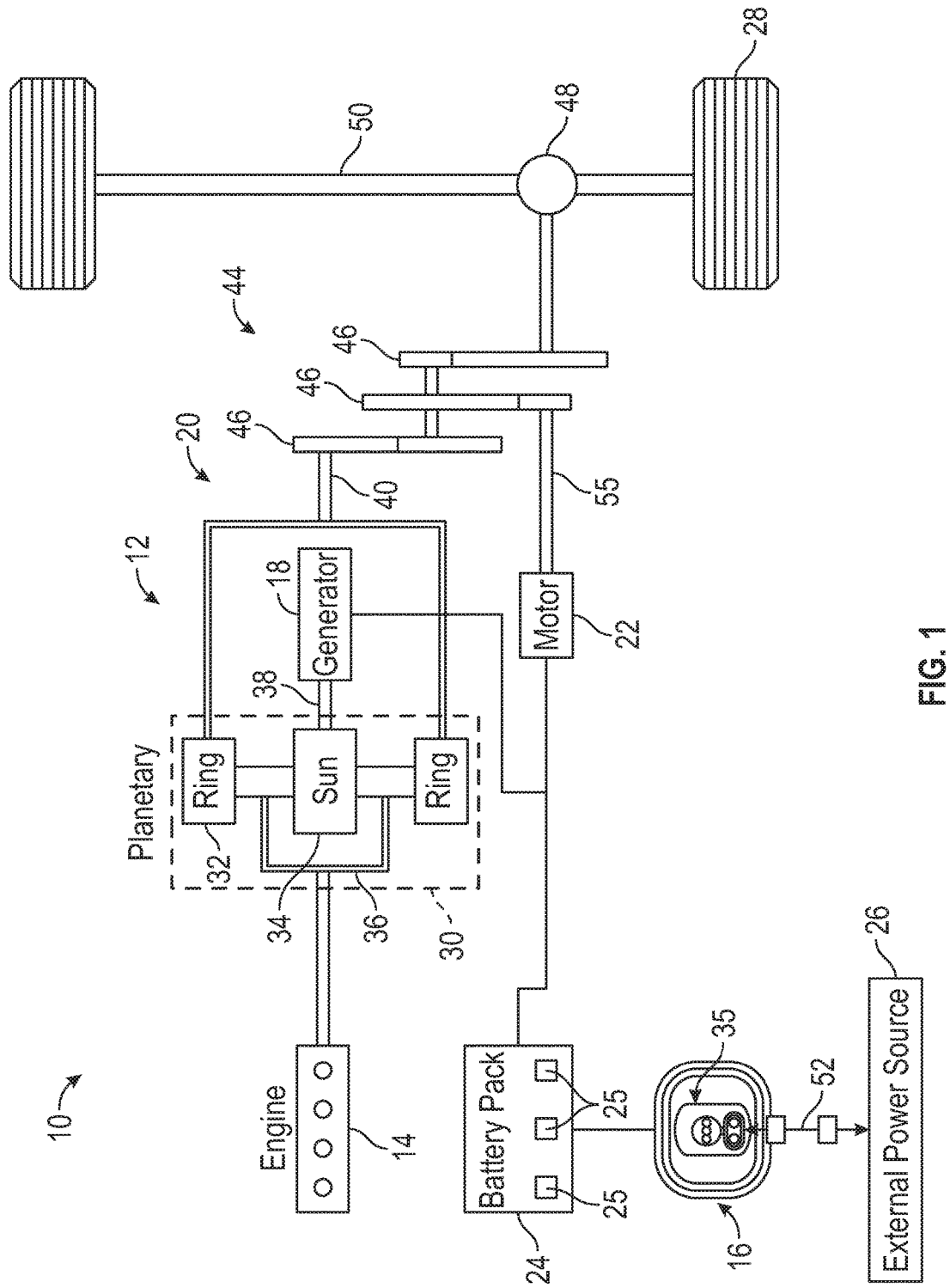
FIG. 1 schematically illustrates a powertrain of an electrified vehicle.

FIG. 1 schematically illustrates a powertrain 10 for an electrified vehicle 12. In an embodiment, the electrified vehicle 12 is a plug-in hybrid electric vehicle (PHEV). In another embodiment, the electrified vehicle is a battery electric vehicles (BEV).

In an embodiment, the powertrain 10 is a power-split powertrain system that employs a first drive system and a second drive system. The first drive system may include a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12.

The engine 14, which in an embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is opera-tively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 55 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices can also be used to electrically power the electrified vehicle 12.

The electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The electrified vehicle 12 is also equipped with a charging system 16 for charging the energy storage devices (e.g., battery cells) of the battery pack 24. The charging system 16 is connectable to an external power source 26 (e.g., utility/grid power from an electrical grid) for receiving and distributing power throughout the electrified vehicle 12.

In an embodiment, the charging system 16 includes a vehicle inlet assembly 35 located on-board the electrified vehicle 12, and an electric vehicle supply equipment (EVSE) assembly 52 that can be operably connected between the vehicle inlet assembly 35 and the external power source 26. The vehicle inlet assembly 35 may include one or more ports adapted to receive a coupler of the EVSE assembly 52. The vehicle inlet assembly 35 is therefore configured to receive power from the external power source 26 and then supply the power to the battery pack 24 for charging the battery cells.

The charging system 16 may be equipped with power electronics for converting AC power received from the external power source 26 to DC power for charging the energy storage devices of the battery pack 24. The charging system 16 is also configured to accommodate one or more conventional voltage sources from the external power source 26 (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure.

Figure 2:
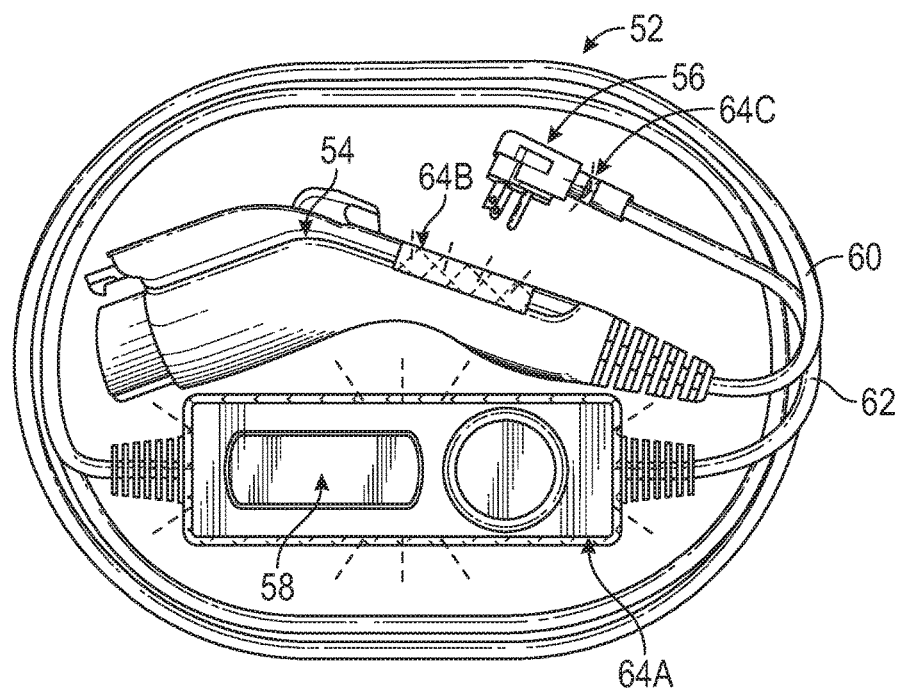
FIG. 2 illustrates an electric vehicle supply equipment (EVSE) assembly for charging an electrified vehicle.

FIG. 2 illustrates an exemplary EVSE assembly 52 that may be used in association with the electrified vehicle 12 of FIG. 1, or any other PHEV or BEV. For example, the EVSE assembly 52 may be part of the charging system 16 of the electrified vehicle 12. The EVSE assembly 52 is a portable device that is removable from the electrified vehicle 12.

In an embodiment, the EVSE assembly 52 includes a coupler 54, a plug 56, and a control box 58. A first wire 60 extends between the coupler 54 and the control box 58, and a second wire 62 extends between the plug 56 and the control box 58. The coupler 54 may be coupled to the vehicle inlet assembly 35 of the charging system 16, and the plug 56 may be plugged into a power outlet connected to the external power source 26 to supply energy from the external power source 26 to the battery pack 24 for charging the battery cells of the battery pack 24.

The control box 58 may sometimes be referred to as a continuous current interruption device (CCID). The control box 58 may include various fuses, relays, transformers, sensors, and other components for detecting charging faults during use of the EVSE assembly 52. The control box 58 may also be equipped with various circuit boards and/or control modules that have processing capabilities for communicating with other components, such as the vehicle inlet assembly 35 and the external power source 26, for example.

A user may experience various charging faults when charging the electrified vehicle 12 using the EVSE assembly 52. Charging system faults generally fall within three categories: 1) external power source faults (e.g., missing ground, defective outlet, etc.); 2) vehicle faults (e.g., ground fault on vehicle inlet assembly 35, over-current events, etc.); and 3) EVSE assembly faults (plug or coupler overheating, etc.).

It may be desirable for the user to quickly identify the source of the charging fault in order to determine whether it is necessary to have a technician service the electrified vehicle 12. The EVSE assembly 52 may therefore be equipped with a fault indicator system that includes multiple fault indicator light assemblies for identifying the source of the charging fault.

In an embodiment, the control box 58 of the EVSE assembly 52 includes a first fault indicator light assembly 64A that can be illuminated in response to EVSE assembly faults, the coupler 54 includes a second fault indicator light assembly 64B that can be illuminated in response to vehicle faults, and the plug 56 includes a third fault indicator light assembly 64C that can be illuminated in response to external power source faults. Together, the control box 52, the first fault indicator light assembly 64A, the second fault indictor light assembly 64B, and the third fault indictor light assembly 64C establish the fault indictor system of the EVSE assembly 52. Additional details of each of the fault indicator light assemblies 64A, 64B, and 64C are discussed in greater detail below.

Figure 3:
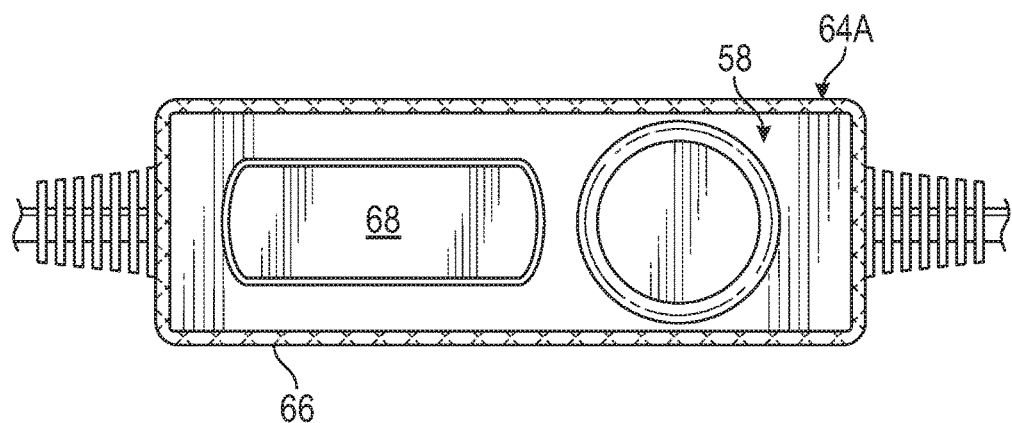
FIG. 3 illustrates a control box of the EVSE assembly of FIG. 2.

FIG. 3 illustrates the first fault indicator light assembly 64A of the control box 58 of the EVSE assembly 52. The first fault indicator light assembly 64A can be automatically illuminated if the source of the charging fault is any component of the EVSE assembly 52.

The first fault indicator light assembly 64A may be mounted on or within a housing 66 of the control box 58. In an embodiment, the first fault indicator light assembly 64A is at least partially embedded within or molded into an upper surface 68 of the housing 66. In another embodiment, the first fault indicator light assembly 64A is disposed about an entirety of an outer perimeter of the upper surface 68. The first fault indicator light assembly 64A may be disposed at any location of the control box 58 that would be easily visible by the user when using the EVSE assembly 52 to charge the electrified vehicle 12.

Figure 4:
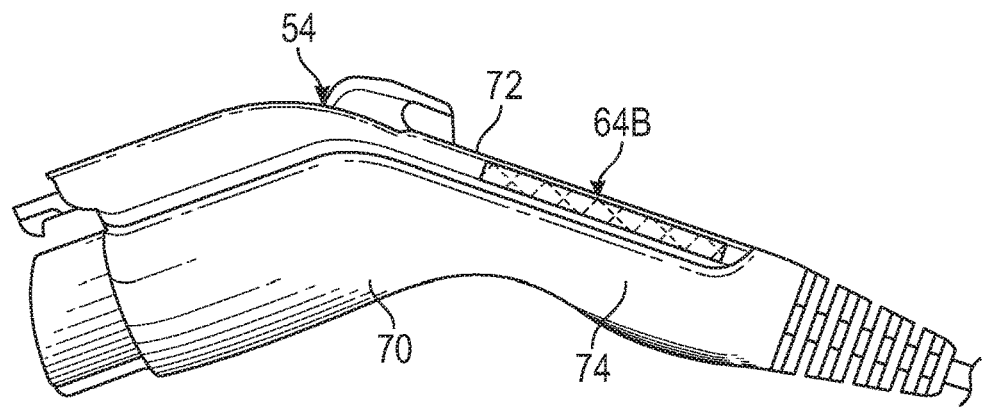
FIG. 4 illustrates a coupler of the EVSE assembly of FIG. 2.

FIG. 4 illustrates the second fault indicator light assembly 64B of the coupler 54 of the EVSE assembly 52. The second fault indicator light assembly 64B can be automatically illuminated if the source of the charging fault is on-board the electrified vehicle 12 (e.g., vehicle inlet assembly 35, etc.).

The second fault indicator light assembly 64B may be mounted on or within a housing 70 of the coupler 54. In an embodiment, the second fault indicator light assembly 64B is at least partially embedded within or molded into an upper surface 72 of the housing 70. In another embodiment, the second fault indicator light assembly 64B is located on a handle portion 74 of the coupler 54. The second fault indicator light assembly 64B may be disposed at any location of the coupler 54 that is easily visible by the user when the coupler 54 is plugged into the vehicle inlet assembly 35 during charging events.

Figure 5:
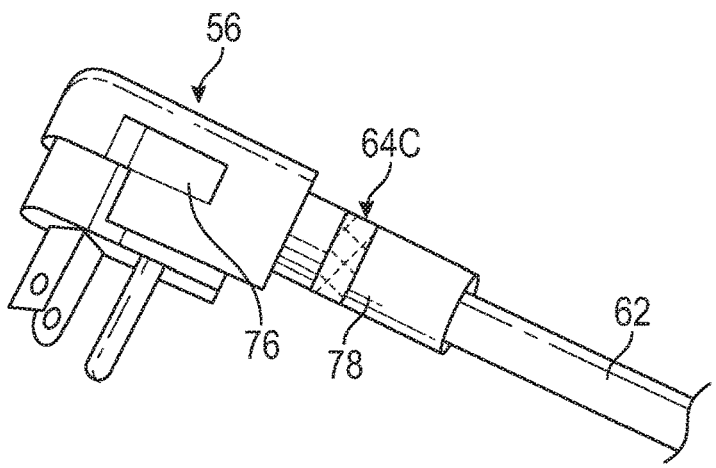
FIG. 5 illustrates a plug of the EVSE assembly of FIG. 2.

FIG. 5 illustrates the third fault indicator light assembly 64C of the plug 56 of the EVSE assembly 52. The third fault indicator light assembly 64C can be automatically illuminated if the source of the charging fault is any part of the infrastructure associated with the external power source 26.

The third fault indicator light assembly 64C may be mounted on or within the plug 56. In an embodiment, the third fault indicator light assembly 64C is at least partially embedded or molded into a plug head 76 of the plug 56. In another embodiment, the third fault indicator light assembly 64C at least partially embedded or molded into a plug shield 78 of the plug 56. In yet another embodiment, the third fault indicator light assembly 64C is molded into or otherwise embedded within the second wire 62 at a location immediately adjacent to the plug 56. In yet another embodiment, the third fault indicator light assembly 64C is a ring disposed around a periphery of the plug head 76, the plug shield 78, or the second wire 62. The third fault indicator light assembly 64C may be disposed at any location of the plug 56 that would be easily visible by the user when the plug 56 is plugged into a wall outlet of the external power source 26.

Figure 6:
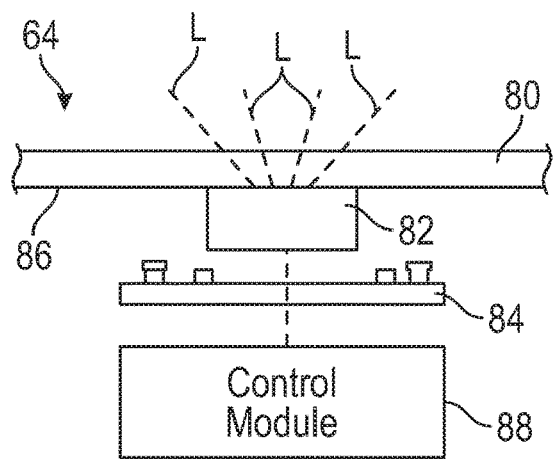
FIG. 6 illustrates a lighting assembly that can be incorporated into the charging components of FIGS. 3, 4, and 5.

FIG. 6 illustrates an exemplary fault indicator light assembly 64 that can be incorporated into any component of the EVSE assembly 52 for visually indicating the sources of detected charging faults. The fault indicator light assemblies 64A, 64B, and 64C described above could each have a configuration similar to the light assembly shown in FIG. 6.

In an embodiment, the fault indicator light assembly 64 includes an insert 80, one or more light sources 82, and a printed circuit board (PCB) 84. The insert 80 may be mounted relative to the components of the EVSE assembly 52 (see, e.g., FIGS. 3, 4, and 5). The insert 80 encloses and/or supports the light source(s) 82. In an embodiment, the insert 80 is sized and shaped to provide an aesthetically pleasing design within the components of the EVSE assembly 52. However, the size and shape of the insert 80 are not intended to limit this disclosure. The insert 80 may be made of polymeric materials, metallic materials, or a combination of such materials. In another embodiment, the insert 80 is light permeable.

The light source 82 may be positioned behind the insert 80, such as near an inner surface 86 of the insert 80, and is configured to emit light L for selectively illuminating the insert 80. In an embodiment, the light source 82 is a light emitting diode (LED). However, other light sources could also be utilized within the scope of this disclosure. In addition, although only a single light source 82 is shown, it should be understood that the fault indicator light assembly 64 could incorporate additional light sources.

The light source 82 may be operably connected to the PCB 84. The PCB 84 may include control circuitry including LED drive circuitry for controlling activation and deactivation of the light source 82.

The light source 82 may be controlled by a control module 88. Although shown near the PCB 84 in FIG. 6, the control module 88 could be located remotely from the PCB 84. In an embodiment, the control module 88 is housed inside the control box 58 of the EVSE assembly 52. The control module 88 may receive and process various inputs for controlling the light source 82 in a desired manner.

The control module 88 may include a processing unit and memory and can be programmed with instructions for controlling when to illuminate the light source 82 for indicating a charging fault. For example, the control module 88 may control when to turn the light source 82 ON and when to turn the light source OFF. The control module 88 may receive and process various inputs from fuses, relays, transformers, sensors, and other components of the control box 58 for controlling the light source 82.

Figure 7:
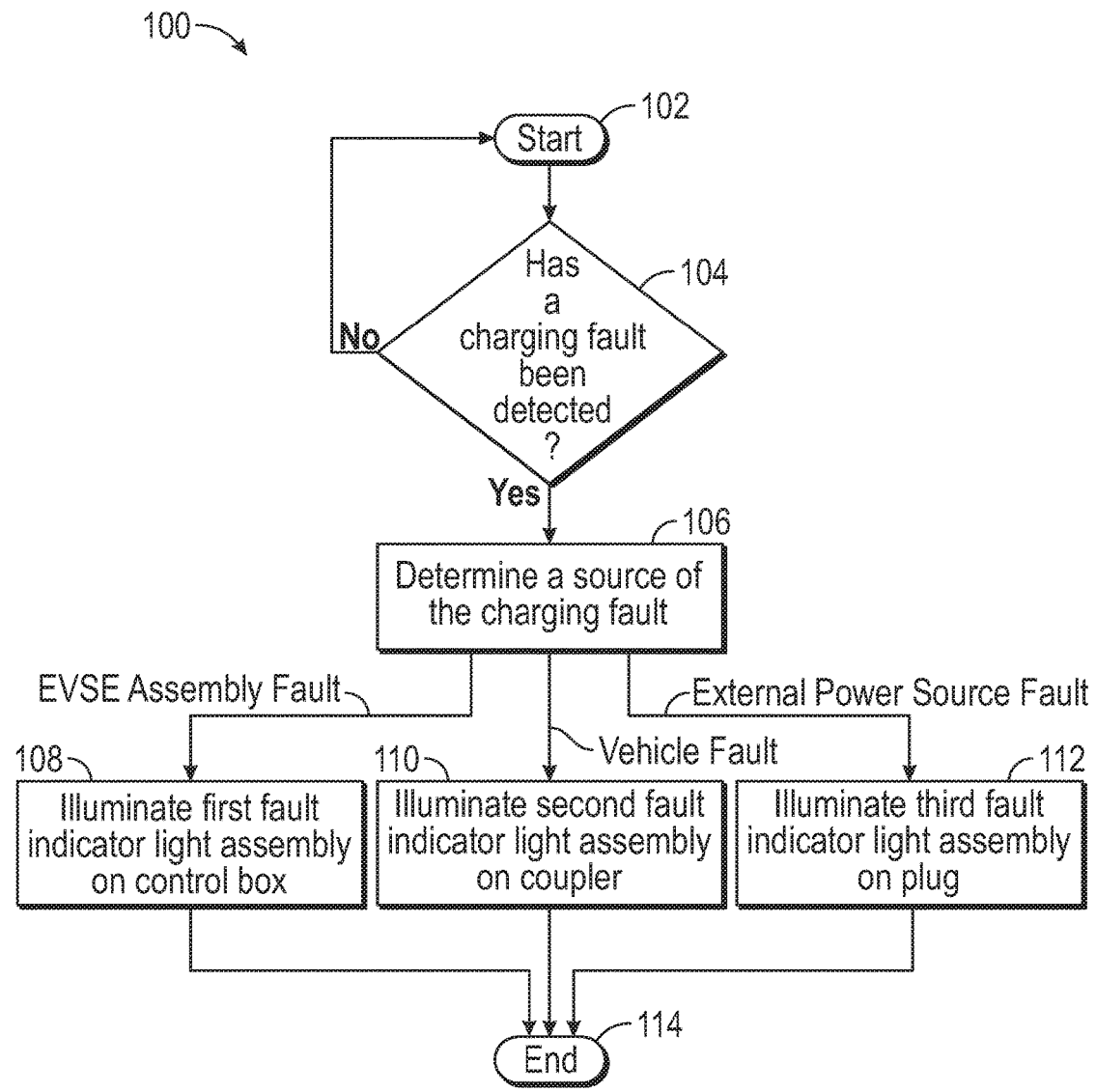
FIG. 7 schematically illustrates a method for indicating different charging faults on an EVSE assembly that is equipped with a fault indicator system.

FIG. 7, with continued reference to FIGS. 1-6, schematically illustrates a method 100 for indicating different charging faults on the EVSE assembly 52. In an embodiment, the control module 88 is programmed with one or more algorithms adapted to execute the exemplary method 100.

The exemplary method 100 begins at block 102. At block 104, the control module 88 monitors whether a charging fault has been detected when the EVSE assembly 52 is being used to charge the electrified vehicle (i.e., the coupler 54 is plugged into the vehicle inlet assembly 35 and the plug 56 is plugged into a wall outlet of the external power source 26). For example, the control module 88 may receive various inputs from fuses, relays, transformers, sensors, and/or other components of the control box 58 to determine whether a charging fault has occurred during the charging event. If block 104 returns a YES flag, the method 100 proceeds to block 106. Alternatively, if a NO flag is returned, the method 100 returns to block 102.

At block 106, the control module 88 determines the source of the charging fault. The control module 88 may illuminate the light source 82 of the first fault indicator light assembly 64A at block 108 if the source of the charging fault is a component of the EVSE assembly 52, or may illuminate the light source 82 of the second fault indicator light assembly 64B at block 110 if the source of the charging fault is on-board the electrified vehicle 12, or may illuminate the light source 82 of the third fault indicator light assembly 64C at block 112 if the source of the charging fault is part of the infrastructure associated with the external power source 26. Once the appropriate fault indicator light assembly has been illuminated, the method 100 may end at block 114.

The EVSE assemblies of this disclosure are equipped with multiple fault indicator light assemblies for providing visual indication of the source of the charging fault. The use of fault indicator light assemblies on specific components of the EVSE assemblies will help the user/technician quickly diagnose the source of the charging failure. The user can therefore avoid driving to the dealership if the source of the charging fault is with infrastructure rather than on the vehicle or within the EVSE assembly.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electric vehicle supply equipment (EVSE) assembly, comprising: a control box including a first fault indicator light assembly; a coupler including a second fault indicator light assembly; and a plug including a third fault indicator light assembly, wherein the plug includes at least two prongs configured for plugging the EVSE assembly into an external power source and wherein the first fault indicator light assembly is disposed about an entirety of an outer perimeter of the upper surface.

2. The assembly as recited in claim 1, comprising a first wire extending between the coupler and the control box, and a second wire extending between the plug and the control box.

3. The assembly as recited in claim 2, wherein the third fault indicator light assembly is disposed on the second wire at a location near the plug.

4. The assembly as recited in claim 1, wherein the first fault indicator light assembly is at least partially embedded or molded within an upper surface of a housing of the control box.

5. An electric vehicle supply equipment (EVSE) assembly, comprising:
   a control box including a first fault indicator light assembly;
   a coupler including a second fault indicator light assembly; and
   a plug including a third fault indicator light assembly,
   wherein the first fault indicator light assembly is at least partially embedded or molded within an upper surface of a housing of the control box,
   wherein the first fault indicator light assembly is disposed about an entirety of an outer perimeter of the upper surface.

6. The assembly as recited in claim 1, wherein the second fault indicator light assembly is at least partially embedded or molded within an upper surface of a housing of the coupler.

7. The assembly as recited in claim 1, wherein the second fault indicator light assembly is located on a handle portion of the coupler.

8. The assembly as recited in claim 1, wherein the third fault indicator light assembly is at least partially embedded or molded into a plug head of the plug.

9. The assembly as recited in claim 1, wherein the third fault indicator light assembly is at least partially embedded or molded into a plug shield of the plug.

10. The assembly as recited in claim 1, wherein the third fault indicator light assembly is a ring that extends around a peripheral surface of a plug head or a plug shield of the plug.

11. The assembly as recited in claim 1, wherein each of the first, second, and third fault indicator light assemblies includes an insert, a light source, and a printed circuit board (PCB).

12. The assembly as recited in claim 1, comprising a control module configured to command illumination of the first fault indicator light assembly if a source of a charging fault is any component of the EVSE assembly.

13. The assembly as recited in claim 1, comprising a control module configured to command illumination of the second fault indicator light assembly if a source of a charging fault is on-board an electrified vehicle.

14. The assembly as recited in claim 1, comprising a control module configured to command illumination of the third fault indicator light assembly if a source of a charging fault is an external power source.

15. The assembly as recited in claim 1, wherein the first fault indicator light assembly is configured to illuminate when a charging fault originates from a first source and the second fault indicator light assembly is configured to illuminate when the charging fault originates from a second source that is different from the first source.

16. The assembly as recited in claim 15, wherein the third fault indicator light assembly is configured to illuminate when the charging fault originates from a third source that is different from the first and second sources.

17. An electric vehicle supply equipment (EVSE) assembly, comprising:
   a control box including a first fault indicator light assembly;
   a coupler including a second fault indicator light assembly; and
   a plug including a third fault indicator light assembly,
   wherein the first fault indicator light assembly includes a first section extending along a first edge of an outer perimeter of a surface of the control box, a second section extending along a second edge of the outer perimeter, a third section extending along a third edge of the outer perimeter, and a fourth section extending along a fourth edge of the outer perimeter.

18. An electric vehicle supply equipment (EVSE) assembly, comprising:
   a control box including a first fault indicator light assembly;
   a coupler including a second fault indicator light assembly; and
   a plug including a third fault indicator light assembly,
   wherein the third fault indicator light assembly is a ring that extends around an entire circumference of a plug head, a plug shield, or a wire of the plug.

* * * * *

UNITED STATES PATENT AND TRADEMARK OFFICE
CERTIFICATE OF CORRECTION

PATENT NO. : 10,427,545 B2
APPLICATION NO. : 15/873942
DATED : October 1, 2019
INVENTOR(S) : Joseph Matthew Turek and Sriram Jala It is certified that error appears in the above-identified patent and that said Letters Patent is hereby corrected as shown below:

In the Claims

In Claim 1, Column 8, Line 42-43; replace "an outer perimeter of the upper surface." with --an outer perimeter of the control box.--

Signed and Sealed this
Eighth Day of March, 2022

Drew Hirshfeld
*Performing the Functions and Duties of the
Under Secretary of Commerce for Intellectual Property and
Director of the United States Patent and Trademark Office*